# United States Patent [19]

Connally

[11] 3,985,609
[45] Oct. 12, 1976

[54] MULTIPLE EFFECT PROCESSES OF CONCENTRATING SOLUTION

[75] Inventor: Carl A. Connally, Tulsa, Okla.

[73] Assignee: Ozark-Mahoning Company, Tulsa, Okla.

[22] Filed: Oct. 21, 1974

[21] Appl. No.: 516,150

[52] U.S. Cl. .............................. 159/48 L; 159/4 A; 159/4 CC; 159/4 VM; 159/16 A; 159/46
[51] Int. Cl.² ...................... B01D 1/14; B01D 1/16; B01D 1/00
[58] Field of Search ............ 165/115, 118; 159/4 A, 159/16 A, 47 WL, 48 L, DIG. 19, 4 K, 4 V.M, 46

[56] References Cited
UNITED STATES PATENTS

| | | | |
|---|---|---|---|
| 614,776 | 11/1898 | Stocker | 159/4 K |
| 2,557,204 | 6/1951 | Richardson | 159/48 L |
| 2,693,247 | 11/1954 | Olstad et al. | 159/4 K |
| 2,764,234 | 9/1956 | Rauh | 159/16 A |
| 2,770,295 | 11/1956 | Allen, Jr. | 159/16 A |
| 3,276,510 | 10/1966 | Austin et al. | 159/DIG. 19 |
| 3,425,477 | 2/1969 | Farin | 159/16 A |
| 3,522,833 | 8/1970 | Mustian, Jr. et al. | 159/16 A |
| 3,638,708 | 2/1972 | Farin | 159/47 WL |
| 3,835,909 | 9/1974 | Douglas et al. | 159/16 A |

*Primary Examiner*—Jack Sofer
*Attorney, Agent, or Firm*—Thomas M. Scofield

[57] ABSTRACT

Improvements in the concentration of solutions in processes involving heating the solution to be concentrated; Processes of solution concentrating where the solution to be concentrated is heated prior to concentration by either director indirectheatexchange,including particular concentrating processes where the heating means and media include: (1) high pressure steam; (2) low-pressure steam and (3) submerged combustion; Improved methods of producing and utilizing vapor-liquid phase separation(s) in solution concentrating processes with the vapor phase(s) utilized as a supplemental heating medium applied to the solution to be concentrated; Incorporation of a plurality of counterflow gas-liquid contact stages (cooling towers) as two phases in processes of concentrating heated solution; Utilization in coordination of a plurality of cooling towers and at least one water heater in processes of concentrating heated solutions.

10 Claims, 4 Drawing Figures

MULTIPLE EFFECT PROCESSES OF CONCENTRATING SOLUTION

BRIEF SUMMARY OF THE INVENTION

This invention is directed to means and methods for most efficiently concentrating solutions. The processes involved all are directed to improvements in concentrating methods which involve applying heat to the solution to be concentrated in such a way that a vapor-liquid phase separation may be made. Additionally, each of the specific processes employs as specific concentrating steps the passing of the heated, at least partly already concentrated solution, sequentially, to the overhead distributors of a plurality of counterflow gas-liquid contactors of the cooling tower type. Particular improvements involve the use of the vapor phase separated from the heated solution to be concentrated as part of the heating medium applied to the incoming feed and recycle solution. The basic heat input to the solution to be concentrated may be from high pressure steam, low pressure steam or submerged combustion. Thus the basic heating of the solution to be concentrated may be by indirect heat exchange, or both. Coordinated with the several cooling towers are at least one water heater which employs as a heating medium the vapor overhead from the first cooling tower.

The solution concentrating process using high pressure steam as the basic heat source to heat the solution involves first passing the solution to be concentrated through a series of indirect heat exchange heating steps while the solution is held under sufficient back pressure to maintain same in liquid form. This heated solution is then passed through a series of flash vaporization or vapor-liquid separation steps. The ultimately concentrated liquid from the last of these steps is passed as overhead liquid feed to the liquid distributor in a first counterflow gas-liquid contact device of the cooling tower type. The vapor overhead from the first cooling tower is used as a heating medium in a water heater whose water load is employed as heating medium in another of the basic solution heating steps. The concentrated liquid bottoms of the first cooling tower are passed to the overhead input feed sprays or nozzles of a second cooling tower. The vapor phase overheads from the liquid-vapor separation steps are used to initially heat the incoming solution in a plurality of the heating steps therefor. Part of the concentrated liquid bottoms from the second cooling tower are passed out of the system as product, while part, typically, are recycled to join the new input feed of solution to be concentrated.

In the process of concentrating a solution which uses low pressure steam as a basic heat source to heat the solution, the solution is passed through a series of indirect heat exchanging steps to raise the temperature while same simultaneously is being maintained under sufficient back pressure that it is in liquid form. The heated solution is then passed to a flash evaporation step to provide a liquid-vapor phase separation. The liquid phase from the flashing step is passed to a first evaporative cooling step wherein it is distributed in counterflow relationship with ambient air in a first cooling tower. The vapor phase from the flash evaporation step is passed in indirect heat exchange with the solution to be concentrated in one of the indirect heat exchange heating steps thereof. The liquid bottoms of the first cooling tower are passed to a second cooling tower wherein they are distributed in counterflow relationship with ambient air. A portion of the liquid bottoms from the second cooling tower is passed from the system as the concentrated product. The balance of the liquid bottoms from the second cooling tower is recycled through the system. There is additionally provided at least one water heater of counterflow liquid-gas direct heat exchange receiving as a heating medium the vapor overhead from the first cooling tower. The heated water or liquid from the water heater is also used to heat the new feed input and recycle solution.

In the high pressure steam system, three-quarters of the concentration takes place in the vapor-liquid separation steps and about one-quarter in the cooling towers. To the contrary in the low pressure steam system. Therein, about one-quarter of the concentration takes place in the vapor-liquid flashing step and approximately three-quarters of the concentration in the cooling towers.

In the process utilizing submerged combustion to heat the solution to be concentrated, the initial liquid-vapor phase separation takes place in the vessel or vessels directly connected with the submerged combustion evaporator or burner. The once-concentrated liquid bottoms therefrom are passed as the overhead liquid feed input to the liquid distributor of a first counterflow gas-liquid contractor of the cooling tower type. The vapor phase from the submerged combustion evaporation vessel or vessels and the vapor phase overhead from the first cooling tower are employed in a counterflow vapor-liquid water heater, the liquid bottoms of which are employed to heat the input feed of the solution to be concentrated. Liquid bottoms from the first cooling tower are concentrated further by counterflow mixing with ambient air in a second cooling tower. The liquid bottoms from the latter are partly removed from the system as product and partly recycled to join the new feed to the concentrating system.

OBJECTS OF THE INVENTION

A first object of the invention is to provide improved methods of and apparatus for concentrating solutions.

Another object of the invention is to provide improved methods of concentrating solutions where high pressure steam is available as a source of heat to the solution to be concentrated.

Another object of the invention is to provide improved methods of and apparatus for concentrating solutions where only low pressure steam is available for heating the solution to be concentrated.

Another object of the invention is to provide improved methods of concentrating solutions wherein the source of heat to the solution to be concentrated is a submerged combustion evaporator.

Another object of the invention is to provide improved methods of utilizing a plurality of cooling towers as concentrating steps in processes of concentrating liquid wherein the heated, already partly concentrated liquid from earlier process stages is supplied to a first counterflow cooling tower for one concentrating step in direct gas-liquid contact with ambient air, the liquid bottoms from the first cooling toward comprising the feed to the distributing header of second cooling tower for another concentrating step.

Another object of the invention is to provide an improved process of concentrating liquids wherein a submerged combustion evaporator is used as an early step in heating the solution to be concentrated and two cooling towers are used as sequential later steps in concentrating the heated, already partly concentrated liquid to be concentrated further, the vapor overheads from the heating step using the submerged combustion evaporator and at least the first cooling tower being used as heating media in a water heater in the system.

Another object of the invention is to provide an improved process for concentrating solutions of various sorts wherein low pressure steam is the available heat source, the process utilizing a plurality of stages of heating the solution to be concentrated, the last such heating step steam heated, the next to last heating step heated by the vapor overhead from a flash separation of the heated solution, one of the first heating steps being a liquid-liquid heating step heated by the liquid bottoms from a water heater, the liquid bottoms from the flash step being further concentrated by liquid-gas counterflow contact in two sequentially staged cooling towers, the vapor overhead from the first cooling tower being one source of heat to the water heater, the liquid bottoms from the second cooling tower being the concentrated product.

Another object of the invention is to provide an improved process of concentrating solutions wherein the heat source is high pressure steam utilizing a plurality of separate heating steps of the solution to be concentrated followed by a plurality of flashing steps, the ultimate liquid bottoms from the last flashing step being finally concentrated in two sequentially staged counterflow cooling towers with the bottoms from the second cooling tower being concentrated product, the overheads from the several flashing steps used to heat a plurality of the initial heating steps of the solution to be concentrated, there being additionally provided at least one water heater using the vapor overhead from the first cooling tower as a heating medium, the heater serving one of the initial heating steps.

Other and further objects of the invention will appear in the course of the following description thereof. In the drawings, which form a part of the instant specification and are to be read in conjunction therewith, several process embodiments of the invention are shown.

IMPROVEMENTS OVER PRIOR ART SYSTEMS

The instant invention is an improvement over the processes of concentrating solutions seen in the United States patent application to Young et al, Ser. No. 443,339, filed Feb. 19, 1974 for "Multiple Effect Processes of Concentrating Solutions". The solution concentrating processes described and shown in the Young et al application Ser. No. 443,339 include processes using high pressure steam as a heat exchanging medium, low pressure steam as a heat exchanging medium (in each case for supplying the basic heat to the solution to be concentrated) and, further, a process utilizing submerged combustion for suplying the basic heat to the solution to be concentrated.

In the high pressure steam process of Young et al Ser. No. 443,339, a plurality of indirect heat exchanging steps are employed to heat the solution, followed by a series of flash vaporization steps which serve to concentrate the solution initially and furnish (from the vapor phases thereof) heat exchange (heating) medium for use in a plurality of the initial heat exchanging steps other than the basic high pressure steam heating step. The liquid bottoms from the last flash vaporization step are then passed to the overhead liquid distributor of a counterflow heat exchanger, that is, a cooling tower. The liquid bottoms from the cooling tower are partially taken from the system as concentrated product and part recycled to join the incoming feed of solution to be concentrated.

In the instant improvement over such high pressure steam concentrating system, two sequentially staged cooling towers are employed as concentrating devices, in combination with at least one water heater which takes the vapor overhead from the first cooling tower as a heating medium thereby to provide heat to inititate the heating of the solution to be concentrated in an additional indirect heat exchanging step.

In the low pressure steam solution concentrating process of Young et al Ser. No. 443,339, after a plurality of sequentially staged indirect heat exchanging steps of the solution to be concentrated (the last one of which involves low pressure steam), the heated solution to be concentrated is passed to a single flash vaporization step. The liquid bottoms from the flash vaporization step are supplied to the overhead liquid distributor of a single cooling tower for further concentration with the liquid bottoms from the cooling tower comprising in part the concentrated product withdrawn from the system and in part recycle to join the input feed of solution to be concentrated. The vapor overhead from the single cooling tower is supplied as a heating medium to a single water heater. The heated water from the water heater and the vapor overhead from the flash vaporization step are separately employed to heat two of the initial heating steps of the solution to be concentrated.

In the instant improved low pressure steam process, an additional cooling tower is employed to further concentrate the liquid bottoms from the first cooling tower. Its liquid bottoms are either passed from the system as concentrated product or recycled to join the incoming feed, or both. A second water heater may be employed with this system to heat exchange an additional initial heating step of the solution to be concentrated.

In the submerged combustion employing concentrating system of Young et al Ser. No. 443,339, the submerged combustion evaporator vessel is itself a first concentrator. The bottoms therefrom are passed to a first cooling tower for concentration in counterflow action with ambient air. The overhead from the submerged combustion evaporator-concentrator is employed as a heat source (joined by the overhead from the cooling tower) for a water heater. Bottoms from the cooling tower are partly removed from the system as concentrated product and partly recycled to join the feed of solution to be concentrated. The water heater load is a preliminary heat exchanging step for the solution to be concentrated.

In the instant improved solution concentrating process utilizing a submerged combustion evaporator as a first concentrating step, as well as a heating step, the bottoms from the first cooling tower are passed to the overhead liquid distributor of a second cooling tower before removal of the bottoms of the second cooling tower partly as feed and partly in recycle. The overhead vapors from the second cooling tower may be employed in conjunction with a second water heater whose heating load is a second preliminary heating step of the solution to be concentrated before passage to the submerged combustion evaporator.

RATIONALE OF TWO COOLING TOWER USE

In certain evaporation processes, the distribution of temperatures throughout the process makes the use of two air blown coolers (as disclosed and described in the instant application) necessary. In the solution concentrating processes of Young et al Ser. No. 443,339 and the instant improvements thereover, heat is recovered by condensing water from hot saturated combustion gases or air. To reuse this heat, it is usually necessary to condense the water at the highest temperature possible. Coupled with the need to condense water at a relatively high temperature is the further need to cool the process stream down to a relatively low temperature in order to evaporate as much water as possible, as well as to make the temperature difference across the system great enough to absorb the heat it is intended to recover.

Typically, the temperature of the solution being concentrated, when it enters the distribution headers of the (first) air blown cooler or cooling tower is between 212°F and 250°F depending on the solution being concentrated. In the high pressure steam system the process can be efficient usually by merely cooling down to moderate temperatures (180°F–160°F). In certain cases the heat in the gases leaving the (first) cooling tower is not necessarily recovered in the high pressure steam system, and the paired or double air blown cooler modification is not necessary. On the other hand, if water conservation or recovery is a critical factor or if evaporation is on a considerable scale (or other such mitigating circumstance is present) the increase in efficiency afforded by the use of the second tower in the high pressure steam system may be significant and call for the second tower.

In low pressure steam systems, as well as submerged combustion systems with heat recovery, it is necessary to recover heat from the gases leaving the (first) air blown cooler and it is usually necessary to cool the process solution to a low temperature. Typically, one would like to recover the heat in the (first) air blown cooler at around 175°F and cool the process solution to around 120°F. However, it is not possible to perform this operation in a single cooling tower because of the relationship between the saturation humidity of the air and the temperature. In the initial or first air blown cooler as is seen in the processes of Young et al Ser. No. 443,339, the solution may be cooled to a moderate temperature so that the saturated air leaves the cooling tower at a sufficiently high temperature for feasible recovery. The saturated air stream off overhead from the initial cooling tower may then be ducted to the water heating tower so that it can heat the circulating water stream. The bottoms from the initial cooling tower are then introduced into the spray header system (in the instant improved processes) of a second air blown cooler or cooling tower where same are cooled to the desired temperature by a second ambient air stream passing in counterflow relationship therewith. In certain circumstances (as seen in the optional process steps illustrated and described) it is desirable and economic to recover the heat from the air stream leaving the second cooling tower. A second water heating tower is then used, as well as an accompanying heat exchanger.

The use of more than two air-blown coolers is theoretically possible, but in most cases practical operating and economic factors rule out the use of more than two cooling towers.

Said otherwise, the need or desirability of employing two air blown cooling towers is basically the same, regardless of the multiple effect system in which it is included. In many processes, it is desirable to have the air leaving the first cooling tower saturated at as a high a temperature as is possible (usually between 185°F and 196°F). For maximum heat recovery and evaporation, it is also necessary to cool the process stream (feed and recycle) to temperature between 120°F and 100°F.

Due to the relationship between the temperature of the air and its saturation humidity, it is not possible to cool the process fluid to 120°F and have the gases leaving the (first) cooling tower saturated with water at the higher temperatures. As an example, if one desired to have the air leaving the (first) cooling tower saturated at 185°F, the lowest temperature one could expect to cool the process fluid would be approximately 159°F using 80°F air. If one simply increased the air rate to obtain a lower liquid temperature, then one also lowers the saturation temperature in the exhausting gases below the desired 185°F.

In all of the multiple effect evaporation systems of Young et al Ser. No. 443,339 and the improved subject systems, one must recover the heat from various points in the process within narrow temperature limits. In fact, the heat cannot be recovered, economically or otherwise, unless it is available at the temperature compatible with the conditions of the process stream. The process stream must be sufficiently cooler than the recoverable heat that there will be a driving force, i.e. temperature differential, causing the heat to flow the hotter medium to the cooler medium.

A second air blown cooler or cooling tower is used (as improvements over the systems of Young et al Ser. No. 443,339) when necessary in order that the proper temperatures for useful heat recovery are obtainable at the proper points in the system. Thus, the air leaving the first cooling tower can be saturated at the temperature desired and the process fluid can be cooled to the temperature necessary in the second cooling tower. Said otherwise, the first cooler maintains the "overhead" temperature needed and the second cooler produces the "bottoms" temperature required. In addition, the double or twin staged cooling tower systems of the instant specification allow more flexibility in operation in each case, since there is more freedom in independently controlling the above mentioned temperature. These systems are not as unforgiving in the matter of design errors as are the single air blown cooler systems of Young et al Ser. No. 443,339.

In any evaporation system, the efficiency is a function of the temperature difference between the lowest and highest temperatures reached by the process stream. It is not a direct function, but the larger the temperature difference, the more effects (and hence the greater the efficiency) obtainable in the system. The trend is that the increase in efficiency with each succeeding effect is successively smaller and smaller, while the costs keep rising steadily, so that, at a certain point, the increase in costs of a further effect outweighs its increase in efficiency.

The latter comprises the reason that heat recovery from air blown coolers in a high pressure steam solution concentrating system is a less appealing possiblility. The increase in efficiency is relatively uneconomical and thus less appealing. Also, to a certain extent, the possibility for heat recovery depends upon the feed temperature. The lower the feed temperature the more favorable are conditions for recovering the heat. The lower temperature systems, low pressure steam or submerged combustion, require heat recovery from the air blown coolers as an integral part of their efficiency due to the small temperature difference in these systems.

The use of a second water heating tower is limited to those cases where the feed temperature is sufficiently low and probably would be proposed or applicable on rare occasions.

The basic reason for employing the second air blown cooler is due to the inability of a single air blown cooler to perform as is necessary per the above.

FIG. 1 (HIGH PRESSURE STEAM SYSTEM)

Figure 1:
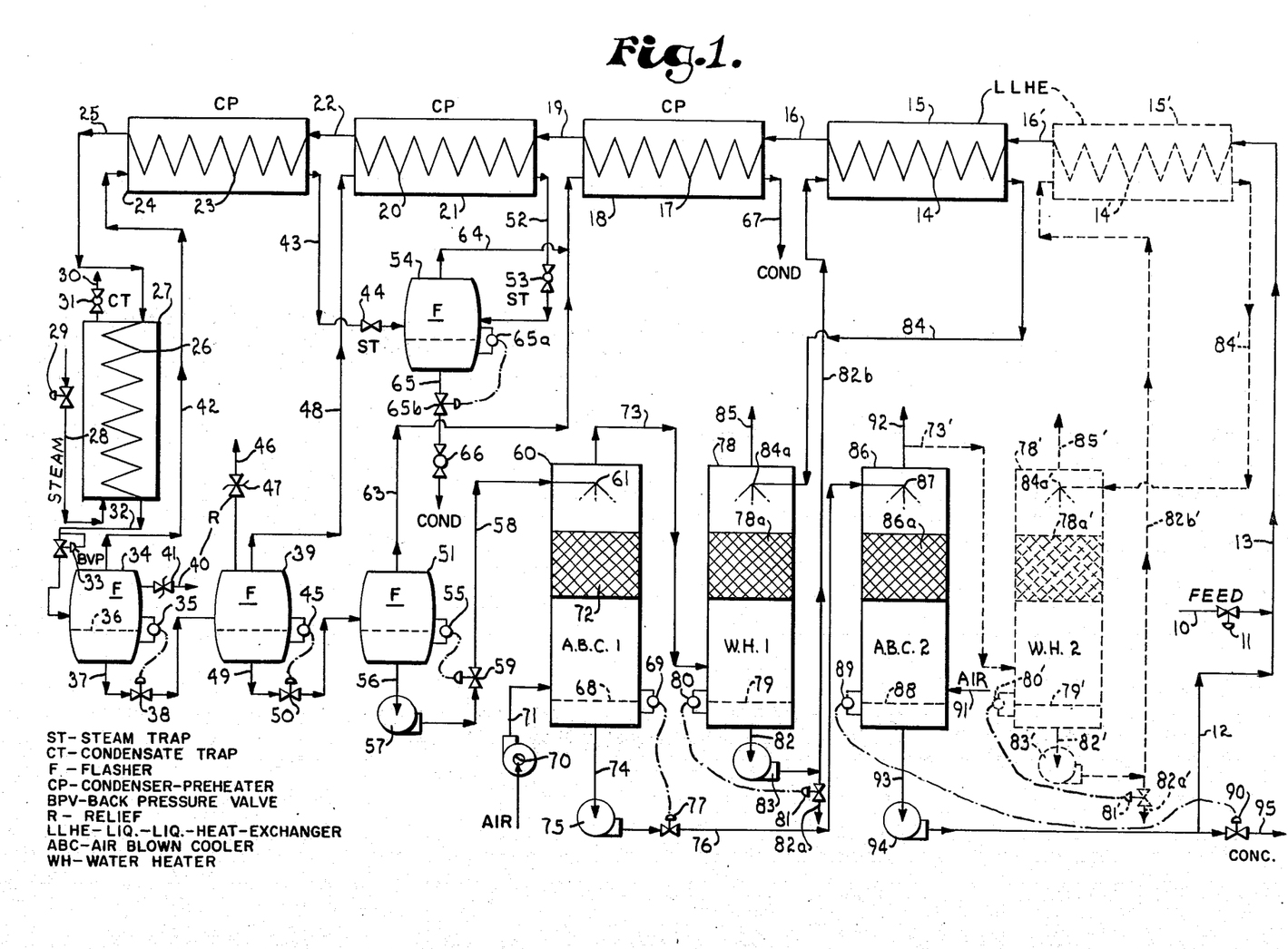
FIG. 1 is a schematic flow diagram of a process for concentrating solutions utilizing high pressure steam as the basic heat source to heat the solution to be concentrated.

Referring to FIG. 1, through feed inlet line 10, there is passed a steam of liquid to be concentrated at a given temperature and pressure, the stream constituting water in a certain percentage and the material to be concentrated in another percentage. Line 10 has thereon flow control valve 11 which may be linked with a conventional flow controller (not seen). This input feed stream through line 10 is joined by recycle line 12 carrying a portion of the bottoms from the second air blown cooler (to be described). The stream in the recycle line 12 is at a specific temperature and pressure, the temperature generally considerably above the input feed temperature. It comprises a lesser percentage of water and a higher percentage of the material to be concentrated. The high concentration in the recycle stream in line 12 is the concentration of the final output product which is another portion of the second cooling tower bottoms diverted from the system (to be described).

From the juncture of lines 10 and 12, there passes line 13 carrying a stream at a given temperature, pressure and concentration, the temperature generally lower than the recycle temperature and higher than the input feed temperature, the concentration higher than the input feed concentration and lower than the recycle concentration.

Line 13 passes into the heat exchange coil 14 of first heat exchanger 15, thereafter exiting from heat exchanger 15 as line 16. [The full line process flow diagram will be first described, whereby the optional passage of line 13 through another heat exchanger (dotted line showing) will not first be described.] Line 16 passes to the heat exchange coil 17 of second heat exchanger or steam condenser 18. The exit line 19 from exchanger 18 passes to the heat exchange coil 20 of the third heat exchanger or steam condenser 21. Exit line 22 from condenser 21 passes to the heat exchange coil 23 of still another (the fourth) heat exchanger or condenser 24. The exit 25 from condenser 24 passes to the heat exchange coil 26 of a final steam condenser (heat exchanger) 27. Exchangers 18, 21, 24 and 27 are all indirect vapor-liquid steam condensers. Exchanger 15 is indirect liquid-liquid heat transfer.

Steam inlet line 28 passes high pressure steam at, say, 366°F and 150 psig through steam supply control valve 29 into condenser 27. Condensate return line 30 exits from condenser 27, passing through condensate trap 31.

Effluent line 32 exiting from the fifth steam condenser 27 carries the now heated liquid to be concentrated at a high temperature and pressure. Thereafter, this liquid is passed through back pressure control valve 33 into a first flash vaporization tank 34. Sufficient back pressure is maintained by valve 33 that the solution to be concentrated in lines 13–22, inclusive is in liquid phase (as well as coils 14, 17, 20, 23 and 26).

Flash tank 34 has level controller 35 maintaining a liquid level therein as at 36. Liquid bottoms are passed from tank 34 through line 37 and level control valve 38 to second flash tank 39. Emergency relief line 40 with pressure relief valve 41 is provided. The overhead through line 42 from first flash tank 34 is steam at a temperature and pressure lower than the temperature and pressure of the liquid in line 32 before valve 33. The liquid bottoms passed through line 37 to second flash tank 39 are at a temperature and pressure the same as the overhead steam through line 42.

The steam in overhead line 42 passes to the third steam condenser 24 in indirect heat exchange with the contents of coil 23, effluent condensate from condenser 24 being passed via line 43 through steam trap 44 to vapor-liquid separator 54 (to be described).

Second flash tank 39 has level controller 45 and emergency relief line 46 with pressure relief valve 47 thereon. The overhead from second tank 39 through line 48 is steam at a lesser temperature and pressure than the steam in line 42. Liquid bottoms from second flash tank 39 pass through line 49 controlled by level control valve 50 to third flash tank 51. The liquid in line 49 is at the same temperature and pressure as the steam overhead through line 48.

The overhead steam from second flash tank 39 through line 48 passes to second steam condenser 21 in indirect heat exchange with the contents of coil 20 therein. The effluent heat exchange medium from third condenser 21 exits through line 52 and steam trap 53 to vapor-liquid separator 54.

Third flash tank 51 has level controller 55 thereon coupled to level control valve 59. Liquid bottoms from tank 51 are passed through line 56, driven by pump 57, passing thereafter via line 58 to distribution header or spray nozzles 61 of a first air blown cooler or cooling tower 60. The liquid in line 58 is in lesser quantity than the liquid in line 32 before valve 33, having been considerably concentrated by vapor removal from flash tanks 34, 39 and 51. It is also at a lower temperature and pressure than the liquid in line 49 from tank 39.

The overhead vapor from third tank 51 passes through line 63 to the first steam condenser 18 and in indirect heat exchange with the contents of coil 17 therewithin. The steam in line 63 is at the same temperature as the liquid in line 58, but zero psig pressure. Line 63 is joined by line 64 overhead from the vapor-liquid separator 54, the contents of this line comprising steam at a lesser temperature than in line 63 (slightly less) and zero psig. Bottoms from vapor-liquid separator (or fourth flash tank) 54 pass out via line 65 and condensate drainer 66. Flow through line 65 may be controlled by level control 65a and level control valve 65b. The effluent line from the first steam condenser 18, at 67, also passes to the condensate system. A tank drainer or steam trap (not seen) may be employed in place of elements 65a and b.

Turning to the first air blown cooler or cooling tower 60, same is illustrated as a counterflow, forced draft, blow-through cooling tower having a sump 68 whose level is regulated by level controller 69 (coupled with valve 77) and having a centrifugal blower or propeller fan 70 supplying air under pressure thereto through duct 71 above the liquid level in sump 68, as well as below fill 72 of the cooler, if such is employed.

The overhead gaseous effluent from cooling tower 60 passes out through duct or line 73 as vapor at an elevated temperature. Liquid bottoms are removed from sump 68 through line 74 driven by pump 75. From pump 75 there passes line 76 flow controlled by valve 77. The liquid in line 76, comprising the bottoms from the first cooling tower 60, has been further concentrated.

There is provided a first water heater 78 typically having conventional fill 78a. The exhaust vapors from duct or line 73 overhead from first cooling tower 60 provide a heat source entering the counterflow water heater 78 below fill 78a. A liquid level 79 is maintained by level controller 80 cooperating with valve 81. Bottoms from water heater 78 pass out through line 82 driven by pump 83. A portion may be passed from the system through line 82a controlled by valve 81. The balance is passed via line 82b as the heat exchanging medium (liquid-liquid indirect heat exchange) in the first heat exchanger 15. This heat exchanging liquid is recycled to the first water heater 78 through line 84 to the distribution header or spray nozzles 84a thereof. As previously stated, heat exchangers 18, 21, 24 and 27 are steam condensers, while heat exchanger 15 is a liquid-liquid exchanger to heat the liquid in coil 14. Vapors are taken off overhead from first water heater 78 through duct or line 85.

On initial start-up of the system tower 78 (and 78' if present) is filled with water. In operation water condenses in the tower and is purged via line 82a (or 82a'). The water heating tower(s) is a source of useful water in cases where water reuse is critical. This is also true of the condensate in lines 65 and 67.

In FIG. 1, there is also provided a second air blown cooler or cooling tower 86. This second cooling tower receives the bottoms from the first cooling tower through line 76 at distribution header or spray nozzles 87. The liquid level 88 in the sump of tower 86 is controlled by level control 89 communicating with valve 90. Air input schematically indicated through duct 91 (from conventional blower or propeller fan) passes upwardly in counterflow relationship with the already concentrated solution distributed from header 87. Fill 86a is conventional, optimal, but optional. The overhead vapors may be passed out of the system via line 92. Liquid bottoms pass out from sump 88 through line 93 driven by pump 94. Concentrated product is withdrawn from the system through line 95 controlled by valve 90 with the balance of the liquid bottoms being recycled in line 12.

There is shown, coupled with the second cooling tower 86, a second water heater and heat exchanger (dotted line showing). This system functions precisely as the system involving the first water heater 78 with the associated liquid-liquid heat exchanger 15. Accordingly, the parts and associated lines of the second water heater and its associated liquid-liquid heat exchanger are numbered the same as those parts and lines of the first water heater 78 and its associated liquid-liquid heat exchanger 15, but primed.

FIG. 2 (LOW PRESSURE STEAM)

Figure 2:
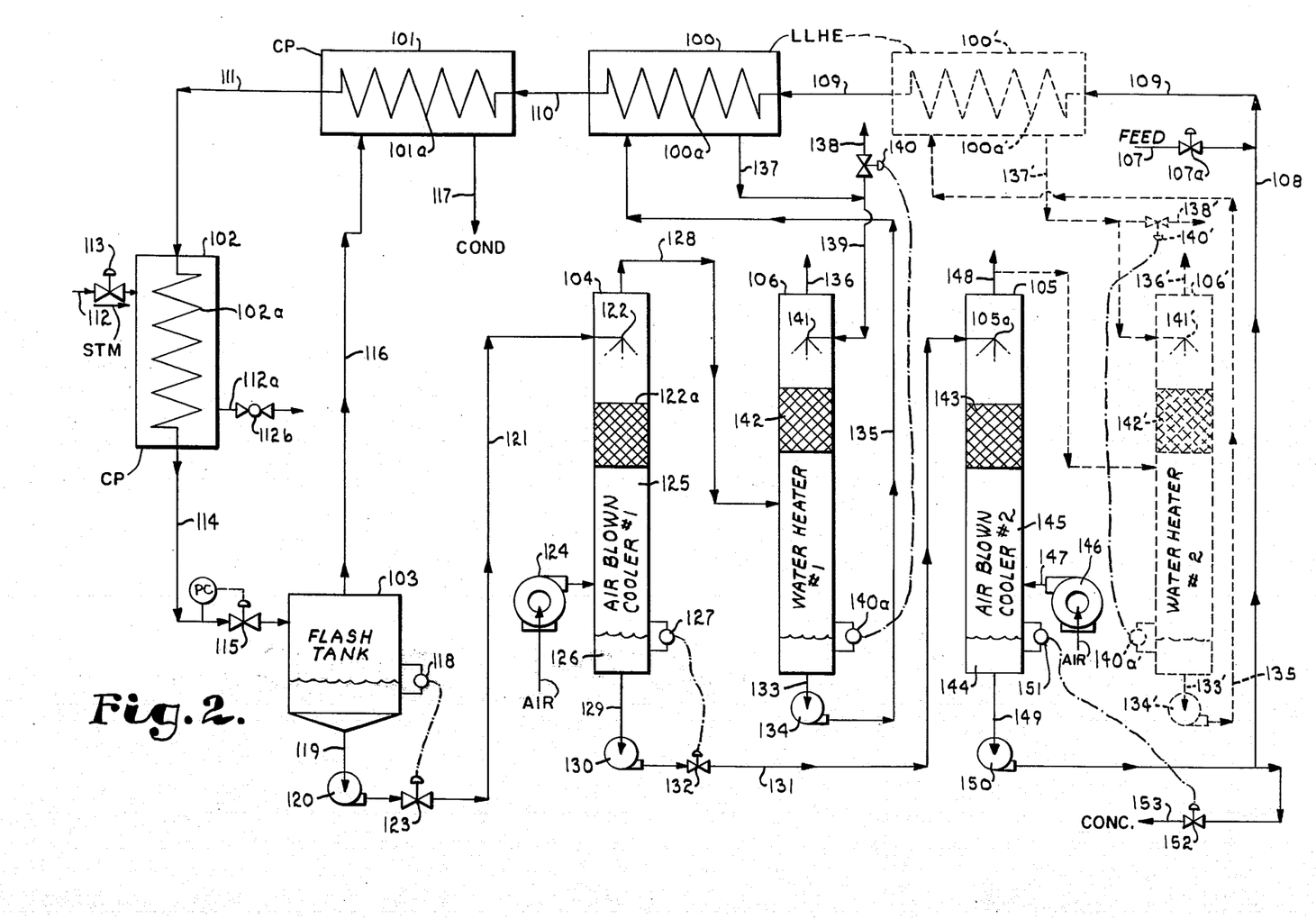
FIG. 2 is a schematic flow diagram of a process for concentrating solutions wherein the basic heat source for heating the solutions to be concentrated is low pressure steam.

FIG. 2 shows the improved solution concentrating process wherein the basic source of heat for the solution to be concentrated is low pressure steam. In the system of FIG. 1, utilizing high pressure steam, three-quarters of the concentration is accomplished in the first three flash tanks, while the remaining evaporation-concentration is accomplished in the two sequential cooling towers. In the system of FIG. 2, there is but a single flash tank employed within which one-quarter of the evaporation-concentration work is accomplished, the remaining three-quarters being accomplished in the two cooling towers.

Turning to a specific description of the process as applied in the specific embodiments of FIG. 2, there are (in the full line showing) three heating vessels 100, 101 and 102. Vessel 100 is a liquid-liquid heat exchanger, while vessels 101 and 102 are steam condensers. A single flash tank is provided at 103 and first and second air blown coolers or cooling towers 104 and 105, respectively. Further, there is water heater 106.

New feed into the system of liquid to be concentrated is supplied through inlet line 107, such flow controlled by valve 107a. The new feed input into line 107 is at a given temperature and pressure in a total quantity of which a certain proportion is water and a certain proportion is the material to be concentrated. Recycle line 108 from the second cooling tower 105 carries most concentrated liquid at a given temperature and pressure. The combined flows of lines 107 and 108 meet in line 109 which passes (full line showing first described) to liquid-liquid heat exchanger 100. Immediately before passing into the coil 100a of exchanger 100, the liquid in line 109 is at intermediate temperatures, pressures and concentrations from the feeds through lines 107 and 108.

Effluent line 110 passes such further heated fluids to the heating coil 101a of steam condenser 101 from which exit line 111 further passes same, further heated, to the heating coil 102a of steam condenser 102. Steam input line 112 controlled by valve 113 passes low pressure steam (for example at 250°F and 15 psig) in needed quantity into condenser 102. Condensate return line 112a exits from condenser 102 having condensate trap 112b thereon.

The effluent, fully heated feed liquid stream to be concentrated from condenser 102 is carried by exit line 114 through back pressure control valve 115 into flash tank 103. Prior to passing through back pressure control valve 115, the liquid feed is at maximum temperature and pressure, the entire system of lines 109, 110, 111 and 114, as well as coils 100a, 101a and 102a being maintained in liquid phase by valve 115.

In flash tank 103 there is a vapor-liquid separation with the overhead vapors passing off through line 116 to steam condenser 101. This overhead is typically 212°F, 0 psig and comprises the heat exchanging steam supply to condenser 101. Effluent steam from condenser 101 is discharged through line 117 to condensate return. Under certain circumstances line 117 may pass to water heater 106 as a second source of heat.

Flash tank 103 has level control 118 mounted thereon coupled with control valve 123. Liquid bottoms from tank 103 pass via line 119 driven by pump 120 to first cooling tower 104 through line 121. The liquid in line 121 has been once concentrated.

First cooling tower 104 is a typical counterflow, forced draft, blow through cooling tower having (optionally) fill or contact surfaces 122a below distribution header 122, propeller fan or centrifugal blower 124 discharging air into plenum 125 below the fill and sump 126 below the air input. Level controller 127 controls the quantity of liquid in sump 126.

The overhead vapor discharge through line 128 passes to water heater 106. Liquid bottoms from first cooling tower 104 are withdrawn through line 129 driven by pump 130 which passes twice concentrated liquid through line 131 controlled by valve 132 to the distribution header or spray nozzles 105a of the second cooling tower 105.

Turning to water heater 106, one heat source thereto is the overhead vapors via duct 128 from the first cooling tower. Water bottoms from heater 106 pass through line 133 driven by pump 134, then via line 135 as the heat exchanging medium for liquid-liquid heat exchanger 100. The overhead vapor discharge from heater 106 is through line 136 which may be vented to atmosphere or passed, alternatively, to an air cooler system (not shown). The effluent heat exchange water from heat exchanger 100 is taken off through line 137 which splits into lines 138 and 139. Line 138 passes to a drain controlled by valve 140 which is linked to level control 140a on water heater 106. Line 139 passes to spray distribution header 141 in water heater 106 above fill or contact surface 142 thereof.

The twice concentrated liquid bottoms from the first air blown cooler 104 are distributed overhead in second cooling tower 105 which has (optional) fill 143 and sump 144. As in the case of the first cooling tower 104, the air blown cooler or cooling tower 105 is preferably a counterflow, blow-through, forced draft cooling tower with air supplied to plenum 145 between fill 143 and sump 144 or blower or propeller fan 146 delivering air under pressure through duct 147.

Overhead vapors, unless a second water heater (dotted line showing) is employed, are taken off through duct 148 overhead on tower 105. further concentrated liquid bottoms are removed via line 149, driven by pump 150. A level control 151 is coupled to product withdrawal valve 152 on line 153. Valve 152 controls the amount of thrice concentrated product liquid withdrawn from the system, the balance of the liquid bottoms taken from the cooling tower sump 144 via line 149 being recycled via line 108 into the system for mix with input feed through line 107.

There may be optionally provided (dotted line showing) a second water heater coupled with a fourth heat exchanger. Such heat exchanger would precede liquid-liquid heat exchanger 100 heated by bottoms from first water heater 106 and also be liquid-liquid, heated by water bottoms from the second water heater. This system functions precisely as does the system involving the first water heater 106 with its associated liquid-liquid heat exchanger 100. Accordingly, the parts and associated lines of the second water heater and its associated liquid-liquid heat exchanger are numbered the same as like parts and lines of the first water heater 106 and its associated liquid-liquid heat exchanger 100, but primed.

FIG. 3 (SUBMERGED COMBUSTION EVAPORATOR)

Figure 3:
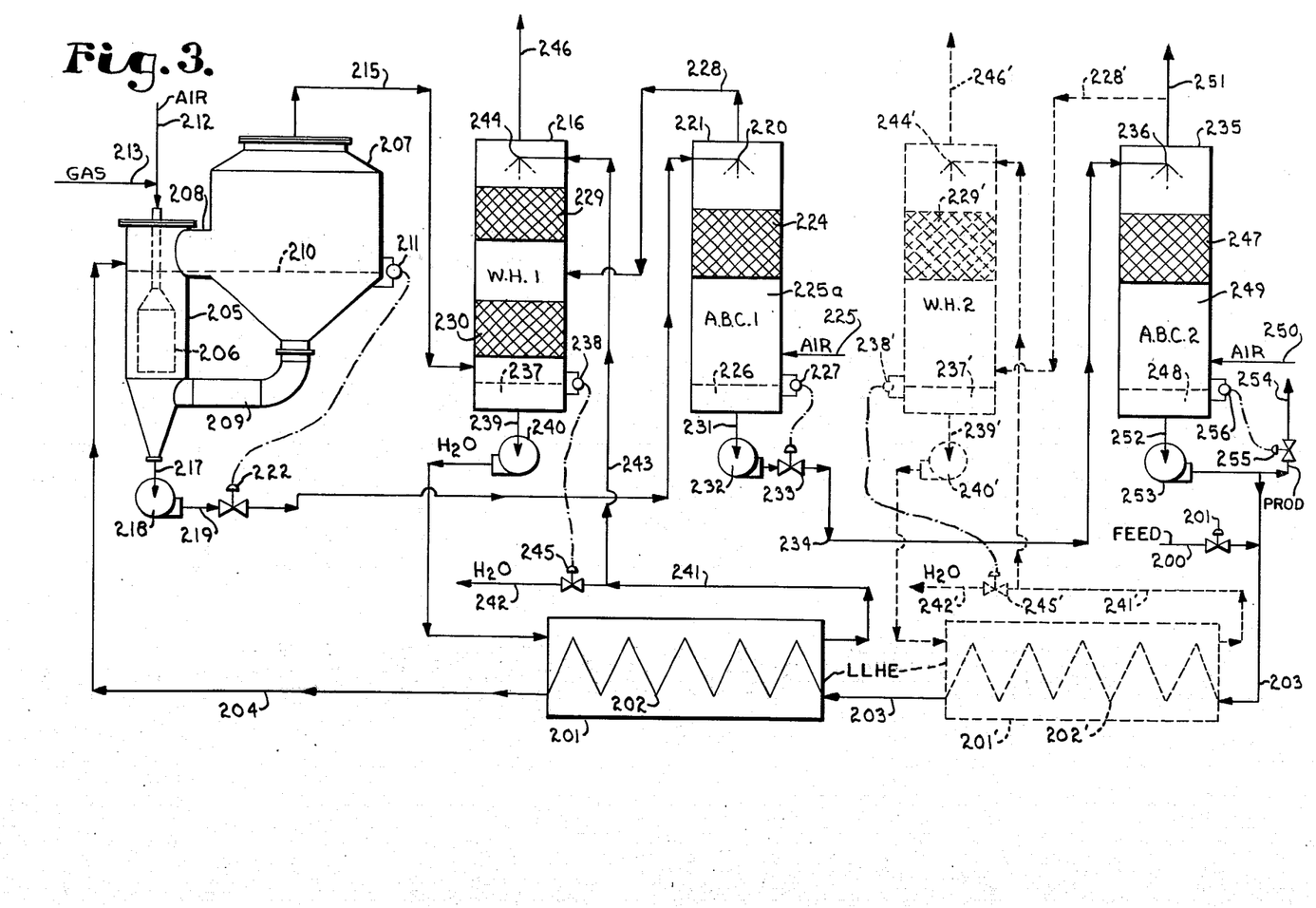
FIG. 3 is a schematic flow diagram of an improved process for concentrating liquids wherein the basic heat source for concentrating the solution is a submerged combustion burner.

FIG. 3 illustrates the use of a pair of cooling towers or air blown coolers in cooperation with a submerged combustion evaporator in concentration and evaporation. Fresh feed of liquid to be concentrated is input through line 200 and mixed with recycle liquid at maximum concentration from the second air blown cooler in line 252. Such flow is controlled by valve 201. Line 203, carrying the partly concentrated mixture of input feed and recycle concentrated liquid passes into the heating coil 202 (full line showing is first described) of liquid-liquid heat exchanger 201. The once heated liquid to be concentrated, both recycle and input feed, in combination, is passed by line 204 to the basic heating vessel 205 containing submerged combustion burner 206 of conventional type.

Associated with vessel 205 containing submerged combustion burner 206 is a large evaporator tank 207. An upper conduit 208 communicates between vessels 205 and 207, while a lower conduit 209 communicates between the lower ends of vessels 205 and 207. Liquid level in vessels 205 and 207, indicated at 210, is controlled by level control 211. With burner 206 operating in vessel 205, circulation between vessels 205 and 207 is clockwise in the view of FIG. 3, namely, from left to right through conduit 208, down in the conical lower portion of vessel 207 and from right to left in conduit 209, upwardly into vessel 205 under the impetus of heat applied to the liquid in vessel 205.

With respect to burner 206, air input line 212 is supplied by conventional motor blower unit (not seen) while gas is supplied through line 213. The gas and air are mixed in a conventional mixer (not shown) and supplied to burner 206 to be burned as a combustible mixture below the surface of the liquid in conventional fashion. Submerged combustion burners as seen in the patents to Doennecke et al, U.S. Pat. Nos. 2,086,902 and 2,159,179, issued July 13, 1937 and May 23, 1939, respectively, may be employed or the improved burner of application Ser. No. 253,541, filed May 15, 1972, now U.S. Pat. No. 3,835,909, inventors Douglas, Young and Phillips for "Improved Method and Apparatus for Submerged Combustion". The latter application also shows the operation of the two vessel evaporator system exemplified by the vessels 205 and 207 with interconnecting conduits 208 and 209 and burner 206.

Water is evaporated from the solution to be concentrated in vessels 205 and 207 by the action of the submerged combustion evaporator 206. Combustion gases and water vapor at a relatively high temperature are taken off through duct 215 which passes to water heater 216 above the liquid level therein. Liquid bottoms are drawn off from the lower portion of vessel 205 through line 217 driven by pump 218 and then passed via line 219 to the liquid distribution header or spray nozzles 220 in first cooling tower 221. Valve 222 coupled with level control 211 is employed to control the quantity of liquid passed through line 219.

First cooling tower 221 is typically and preferably a forced draft, counterflow, blow-through heat exchanger optionally having contact surfaces or fill 224 below distribution header 220 and above the forced air input schematically designated at 225, which is typically supplied from a propeller fan or centrifugal blower (not shown). Duct 225 discharges into plenum 225a which is positioned between fill 224 and sump 226. Level controller 227 controls the level of liquid in sump 226.

The heated vapor overhead from cooling tower 221 passes out through duct 228 which enters water heater 216 below a first stage 229 of fill therein but above a second stage 230 of fill. The lower stage 230 is positioned between the input of line 228 from cooling tower 1 and line or duct 215 carrying overhead vapors from vessel 207. Cooled, liquid bottoms, twice concentrated, are drawn off from sump 226 of cooling tower 221 through line 231 driven by pump 232. Level controller 227 is coupled with valve 233 on line 234 which passes twice concentrated liquid to the distribution headers or spray nozzles 236 of a second cooling tower 235.

Turning to water heater 216, the liquid level therewithin, 237 (sump) is controlled by level controller 238. Liquid bottoms from sump 237 are withdrawn through line 239 driven by pump 240 and passed to liquid-liquid heat exchanger 201 to heat the incoming feed of liquid to be concentrated in coil 202 of exchanger 201. Effluent return line from exchanger 201 (line 241) divides into lines 242 and 243. The latter returns to water heater 216 above upper fill section 229 and discharges into distribution heaters or spray nozzles 244. Flow out of the system through line 242 is controlled by valve 245 coupled with level control 238. Overhead vapors from water heater 216 are discharged to atmosphere or an air cooler via duct 246.

Turning to second cooling tower 235, this tower is similar in structure and operation to first cooling tower 221. Optional fill 247 and sump 247 define plenum 249 therebetween into which discharges duct 250 carrying air under pressure from a centrifugal blower or propeller fan. In the full line showing, overhead vapors are passed out of the system via duct 251. Thrice concentrated liquid bottoms are withdrawn via line 252 driven by pump 253. Line 252 splits into recycle line 203 (previously described) and product withdrawal line 254. Valve 255 on product withdrawal line 254 is coupled with level controller 256 on the second cooling tower.

There is shown, coupled with second cooling tower 235, a second water heater and heat exchanger (dotted line showing). This system functions similarly to the system involving the first water heater 221 with its associated liquid-liquid heat exchanger 201. Accordingly, the parts and associated lines of the second water heater and its associated liquid-liquid heat exchanger are numbered the same as those parts and lines of the first water heater 216 and its associated liquid-liquid heat exchanger 201, but primed.

GENERAL REMARKS (FIGS. 1–3, INCL.)

Referring to the systems of FIGS. 1–3, inclusive, these comprise multiple effect evaporators. The process of FIG. 1 for high pressure steam is a process where evaporation is carried out in each of the three flash tanks with the solution being further concentrated in the two cooling towards. Heat is recovered in each of the illustrative heat exchangers. The process of FIG. 2, for (typically) 15 psig steam, is a system where evaporation is carried out in the single flash tank and two air blown coolers with heat recovered in at least one water heater. If lower pressure steam, say at 3 psig, were used, the heat that could be recovered might not justify the use of the flash tank and its associated heat exchanger. Without such flash tank and its associated heat exchanger, the system of FIG. 2 would be less efficient.

The process of FIG. 3 is a system where heat is recovered by condensing water vapor from both the submerged combustion evaporator and at least the first cooling tower.

A settling tank may also be used in each of the illustrated systems, if solids are precipitated.

The use of the air blown coolers shown in the systems illustrated and described is a marked improvement over the vacuum systems used in multiple effect evaporators now on the market. Less energy and materials are required to install and operate a multiple effect evaporator with air blown coolers than for a multiple effect vacuum evaporator. This is important in view of the current energy crisis and shortage of materials. A submerged combustion evaporator with a heat recovery system including air blown coolers uses considerably less fuel and results in less air pollution than a single effect submerged combustion evaporator.

A single vessel submerged combustion evaporator may be used in place of the preferred double vessel system seen in FIG. 3. The recycle is necessary for each type of system (high pressure steam, low pressure steam and submerged combustion) and must be used to recover the heat in sufficient quantities and cause the necessary evaporation. The evaporation rate is in fact controlled by the amount of material being recycled. More evaporation within a given system requires more recycle and turning down the system requires lowering the recycle rate. While the feed concentration and temperature are raised after mixing with the recycle, it must be remembered that the recycle concentration and temperature are lower after mixing with the input feed of liquid to be concentrated.

As previously noted, the basic factor for utilizing the second air blown cooler is primarily to achieve the proper temperatures for heat recovery. In general, the second air blown cooler improvement is vital to the efficiency and proper operation of both the low temperature steam process and the submerged combustion heat recovery process. It will only be the odd instance in these systems where one air blown cooler will be used. This is due to the relatively low maximum temperature reached in each system and the need for reducing the minimum temperature reached in the system to as low a value as possible. The second air blown cooler may only be used in special cases with the high pressure steam system because, in most cases, the additional efficiency does not off-set the added complexity and cost. The high pressure steam system may be varied by the use of only two flash tanks. There is the option of using more than three flash tanks if very high pressure steam is available and operating characteristics permit the use of higher temperatures, also.

SPECIFIC EXAMPLE – LOW PRESSURE STEAM – FIG. 2

A specific example giving numerical data for the system of FIG. 2 utilizing low pressure steam as a heat exchanging medium comprises the following. Feed into line 107 comprises 13,650 lb/hr of water carrying 250 lb/hr of solids (for a total of 13,900 lb/hr) at a temperature of 50°F and pressure of 77 psig.

The material in line 109 immediately before heat exchange at 100, including both feed and recycle, would include 94,912 lb/hr of water and 18,088 lb/hr of solids (for a total of 113,000 lb/hr) at a temperature of 107°F and pressure of 75 psig.

After heat exchange at 100, 101 and 102, the 94,912 lb/hr of water and 18,088 lb/hr of solids (for a total of 113,000 lb/hr are at a temperature of 270°F and pressure of 40 psig. This is in line 114 prior to passage through valve 115.

After passage through valve 115 and receipt in flash tank 103, the overhead vapor in line 116 comprises 4,546 pph of water (steam) at a pressure of 1 psig and temperature of 225°F. The bottoms from the flash tank in line 21 after valve 123 comprise 90,366 lb/hr of water and 18,088 lb/hr of solids (for a total of 108,454 lb/hr at a temperature of 225°F and pressure of 22 psig.

The effluents from the first air blown cooler 125 include the overhead through line 128 and the bottoms taken out through line 131. With respect to the former, this comprises 6,254 lb/hr of water and 9,698 lb/hr of air giving a total of 15,952 lb/hr (5406 ACFM) at a temperature of 191°F. With respect to the latter in line 131, this comprises 84,112 lb/hr of water and 18,088 lb/hr of solids for a total of 102,200 lb/hr at a temperature of 154°F and pressure of 22 psig.

Looking at the bottom effluent from the second air blown cooler 105, the recycle stream in line 108 before feed line 107 comprises 81,262 lb/hr of water and 17,838 lb/hr of solids for a total of 99,100 lb/hr at a temperature of 120°F and pressure of 78 psig. The product discharge from line 153 comprises 1,040 lb/hr of water and 250 lb/hr of solids for a total of 1,390 lb/hr at a temperature of 120°F and pressure of 5 psig. This material may be further concentrated, if desired in a conventional heater such as a submerged combustion evaporator or the like.

The bottoms from water heater 106 passing to heat exchanger 100 comprise 104,649 lb/hr of water at a temperature of 170°F and pressure of 45 psig. The overhead from the first water heater 106 through line 136 comprises 1,110 lb/hr of water and 9,698 lb/hr of air for a total of 10,808 lb/hr at 2863 ACFM, being at a temperature of 134°F.

With respect to the input of fan 124 into the first air blown cooler 104, this comprises 9,698 lb/hr of air at 80°F, 2,200 ACFM. The input of air into the second air blown cooler 105 from fan 146 through line 147 comprises 15,115 lb/hr of air at 80°F, 3428 ACFM.

The overhead exhaust from the second air blown cooler through line 148 comprises 2,536 lb/hr of water and 15,115 lb/hr of air for a total of 17,651 lb/hr, 4877 ACFM, at a temperature of 145°F.

FIG. 4 (SUBMERGED COMBUSTION EVAPORATION VARIATION)

Figure 4:
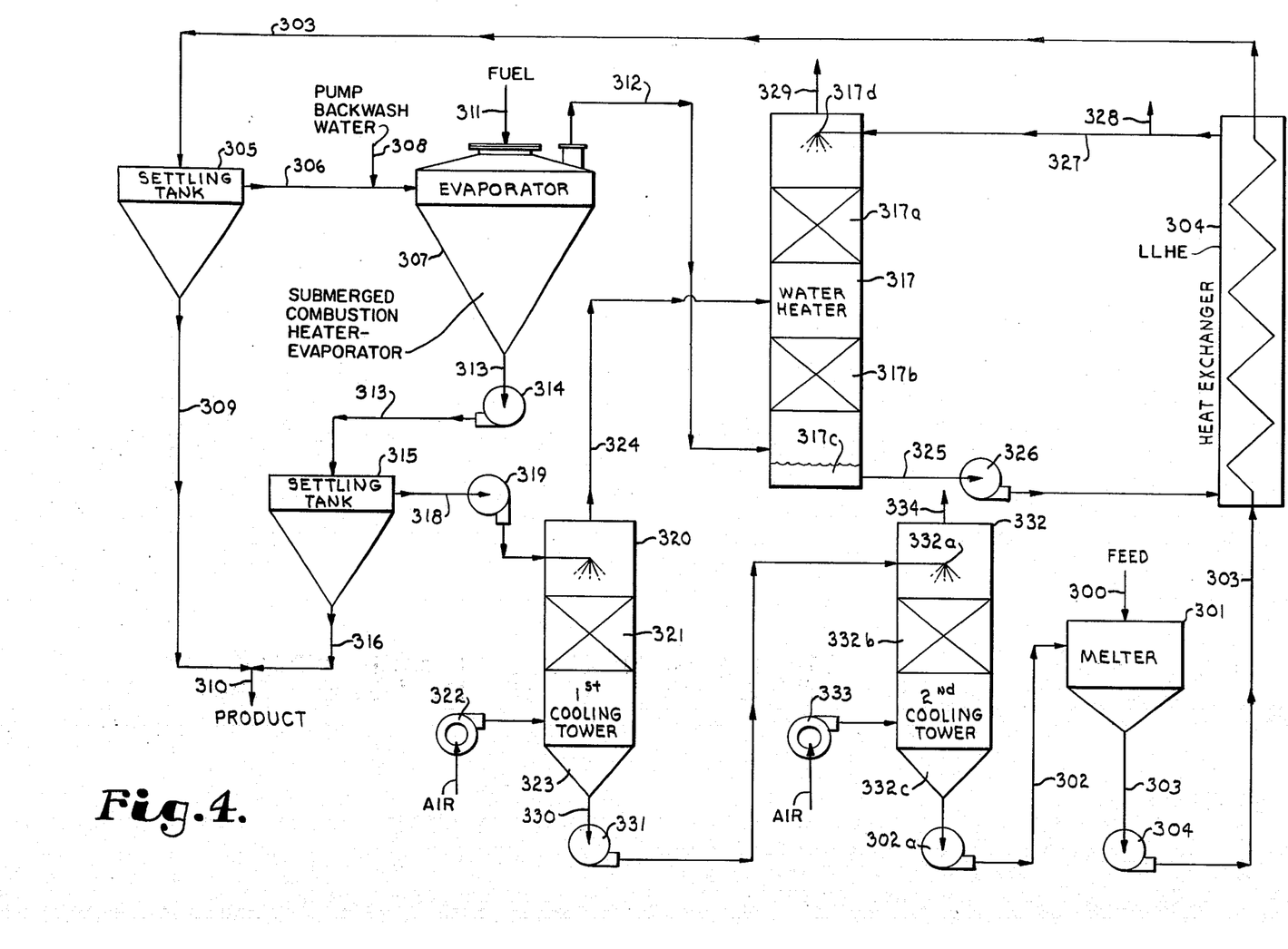
FIG. 4 is a schematic flow diagram of a variant sytsem closely analogous of that of FIG. 3 employing a pair of cooling towers or air blown coolers in cooperation with a submerged combustion evaporator in concentration and evaporation.

FIG. 4 is a schematic flow diagram of a variant system closely analogous to that of FIG. 3 employing a pair of cooling towers or air blown coolers in cooperation with a submerged combustion evaporator in concentration and evaporation. This system differs in that two settling tanks have been added to take out precipitated solids and one melter has been added. In the particular instance to be described, the feed enters in solid form and is melted by the hot recycle.

Turning to FIG. 4, in a specific example of a system involving the instant improvements, input feed via line 300 to melter 301 is of Glauber's salt at 50°F made up of 18,333 lb/hr of sodium sulfate ($Na_2SO_4$) and 27,500 lb/hr of water. Melter 301 also receives, via line 302 a recycle stream in the amount of 118,615 lb/hr of sodium sulfate and 256,321 lb/hr of water, concentration 31.69% at 121°F. The melter discharge, then, via line 303, driven by pump 304 comprises a solution of 136,948 lb/hr of sodium sulfate in 283,821 lb/hr of water, concentration 32.55% at 100°F.

Line 303 then passes to heat exchanger 304 where the contents of line 303 are further heated and thence to settling tank 305. The settling tank overflow is passed via line 306 to conventional submerged combustion evaporator 307 and comprises 125,792 lb/hr of sodium sulfate and 283,821 lb/hr of water, concentration 30.71% at 162°F. Into line 306, via line 308, is passed, typicaly, pump backwash water in the amount of 750 lb/hr. Bottoms from settling tank 305, comprising sodium sulfate in the amount of 11,156 lb/hr are passed via line 309 to product discharge line 310 going to a centrifuge.

Heat input to evaporator 307 (schematically indicated at 311) is in the amount of 21,122,960 BTU's per hour. The overhead products of combustion from evaporator 307 are taken off via line 312 and comprise 15,718 lb/hr of dry gases, 2,002 lb/hr of water of combustion and 11,845 lb/hr of evaporated water all at 189°F. The concentrated solution taken off as evaporator bottoms discharge via line 313 is passed by pump 314 to second settling tank 315 and comprises 125,792 lb/hr of sodium sulfate and 272,726 lb/hr of water, concentration 31.56% at 182°F. Product bottoms from settling tank 315 pass via line 316 to centrifuge line 310 and comprise 7,177 lb/hr of $Na_2SO_4$. Thus the total product to the dryer via line 310 is 18,333 lb/hr of sodium sulfate.

Counterflow water heater 317 having upper and lower fill sections 317a and 317b, respectively, receives below fill section 317b the products of combustion and water and vapor via line 312.

The settling tank 315 overflow is taken off via line 318, driven by pump 319 and comprises 118,615 lb/hr of sodium sulfate and 272,726 lb/hr of water, concentration 30.31% at 182°F. This solution is passed to the overhead spray inputs in a counterflow first cooling tower of blow-through type 320 typically having fill section 321 and centrifugal fan or propeller fan 322 supplying air thereto below fill section 321 and above sump 323. The overhead air blown cooler or cooling tower exhaust from tower 320 via line 324 comprises 22,732 lb/hr of dry air and 10,634 lb/hr of water vapor saturated at 167°F but at a temperature of 172°F. The cooling air input from fan 322 to tower 320 comprises 22,732 lb/hr of dry air and 286 lb/hr of water vapor, 50% saturated at 80°F. The input from line 324 to water heater 317 is intermediate to the two fill sections 317a and 317b of the latter.

Water heater 317 provides heated water from its sump 317c via line 325 driven by pump 326 in the quantity of 321,093 lb/hr at 172°F to heat exchanger 304. The return of cooled water to the overhead spray input 317d of water heater 317 is via line 327 in the amount of 302,781 lb/hr of water at 110°F. Condensate is taken off via line 328 in the quantity of 18,314 lb/hr of water at 110°F. The water heater exhaust overhead line 329 carries 38,450 lb/hr of dry air and gases and 6,167 lb/hr of water vapor at 137°F, 100% saturated.

The bottoms from first cooling tower 320 are taken off via line 330 driven by pump 331 and pass to the spray input heads 332a of second cooling tower 332 which has fill section 332b and sump 332c. Counterflow air is provided via fan 333. The bottoms discharge from first air blown cooler 320 is in the amount of 118,615 lb/hr of sodium sulfate and 262,378 lb/hr of water, concentration 31.13% at 145°F.

The cooling air into second cooling tower 332 is in the amount of 50,729 lb/hr of dry air and 639 lb/hr of water vapor, 50% saturated at 80°F. The tower exhaust overhead via line 334 is in the amount of 50,729 lb/hr of dry air and 6,696 lb/hr of water vapor saturated at 131°F at 135°F. The bottoms discharge from the second cooling tower into line 302 which is driven by pump 302a has already been described as feed to the melter 301.

From the foregoing, it will be seen that this invention is one well adapted to attain all of the ends and objects hereinabove set forth together with other advantages which are obvious and which are inherent to the process.

It will be understood that certain process features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A process of concentrating a solution comprising the steps of:
    continuously heating a liquid body of the solution to be concentrated in a first vessel to drive off water vapor therefrom and heat the said body to a high temperature in a first heating and vaporizing step;
    passing the overhead vapor from said first vessel to a counterflow gas-vapor-liquid direct heat exchange water heater as at least part of the heating medium thereto;
    passing the concentrated hot liquid bottoms from said first vessel as the overhead liquid input to a first counterflow cooling tower in gas-liquid contact with ambient air for further concentration thereof;
    withdrawing concentrated liquid bottoms from the first cooling tower and passing the liquid bottoms from the first cooling tower as the overhead liquid input to a second counterflow cooling tower in gas-liquid contact with ambient air for further concentration thereof;
    passing the vapor overhead from the first cooling tower to said counterflow water heater as another part of the heat exchanging medium thereto;
    continuously joining a continuous stream of new solution to be concentrated with at least a portion of the concentrated liquid bottoms from the second cooling tower into a combined flow thereof,
    thereafter passing said combined flow in indirect liquid-liquid heat exchanging relationship with the liquid bottoms from the water heater prior to passing said combined flow to said first heating and vaporizing step to be concentrated therein;
    passing said combined flow after heat exchange with said water heater bottoms as a continuous feed to said first heating and vaporizing step to replace liquid evaporated therefrom;
    passing at least part of said heat exchanged liquid bottoms to the overhead liquid input of said water heater as feed thereto, and
    passing concentrated solution out of the system as product.

2. A process as in claim 1 wherein said water heater is two-stage with vertically separate vapor input thereto with the vapor input from the first cooling tower positioned above the vapor input from the heating and vaporizing step.

3. A process as in claim 1 wherein a portion of the air-vapor overhead from the second cooling tower is passed to a second counterflow water heater as at least part of the heating medium thereto and said combined flow is also passed in indirect heat exchanging relationship with liquid bottoms from said second water heater prior to passing said combined flow to the first vessel heating and vaporizing step and passing at least a portion of said heat exchanged liquid bottoms from said second water heater to the overhead liquid input of the second water heater as feed.

4. A process as in claim 1 wherein the concentrated product withdrawn from the system is taken from the liquid bottoms from the second cooling tower as the remaining portion of said bottoms.

5. A process as in claim 1 wherein the concentrated product withdrawn from the system is taken from both the said combined flow after heat exchange thereof and the concentrated hot liquid bottoms from said first vessel.

6. A process of concentrating a solution comprising the steps of:
    initially heating a feed solution to be concentrated in a first indirect heat exchange vessel in a first heating step;
    passing at least a portion of the effluent from said first heating step to a second vessel for a second, direct contact, vaporizing-heating step;
    continuously heating solution to be concentrated in said second vessel to drive off water vapor therefrom and heat said body to a high temperature in said second heating-vaporizing step;
    passing the overhead vapor from said second vessel to a counterflow vapor-liquid direct heat exchange water heater as at least part of the heat exchange medium thereto;
    passing at least a portion of the concentrated liquid bottoms from said second vessel as the overhead liquid feed input to a first counterflow cooling tower in gas-liquid contact with ambient air for further concentration thereof;
    withdrawing concentrated liquid bottoms from the first cooling tower and passing same as the overhead liquid feed input to a second counterflow cooling tower in gas-liquid contact with ambient air for further concentration thereof;
    passing the vapor overhead from the first cooling tower to said counterflow water heater as another part of the heating medium thereof;
    continuously joining a continuous stream of new solution to be concentrated with at least a portion of the concentrated liquid bottoms from the second cooling tower into a combined flow thereof;
    thereafter passing said combined flow as said feed solution to be initially heated in indirect liquid-liquid heat exchanging relationship with the liquid bottoms from the water heater in said first heating step prior to passing said combined flow to said second heating-vaporizing step to be concentrated therein;

passing at least part of said heat-exchanged liquid bottoms to the overhead liquid input of said water heating as feed thereto, and passing concentrated solution out of the system as product.

7. A process as in claim 6 wherein said water heater is two-stage with vertically separate vapor inputs thereto with the vapor input from the first cooling tower positioned above the vapor input from the second heating-vaporizing step.

8. A process as in claim 6 wherein a portion of the air-vapor overhead from the second cooling tower is passed to a second counterflow water heater as the heating medium thereto and said combined flow is also passed in indirect heat exchanging relationship with liquid bottoms from said second water heater prior to passing said combined flow to the second heating-vaporizing step and passing at least a portion of said heat exchanged liquid bottoms from said second water heater to the overhead liquid input of the second water heater as feed.

9. A process as in claim 6 wherein the concentrated product withdrawn from the system is taken from the liquid bottoms from the second cooling tower.

10. A process as in claim 6 wherein the concentrated product withdrawn from ths system is taken from both the said combined flow after the heat exchange thereof and the concentrated hot liquid bottoms from said second heating-vaporizing step.

* * * * *